Jan. 27, 1942.  L. S. HAMER  2,271,138
LINE BLIND
Filed Feb. 15, 1941
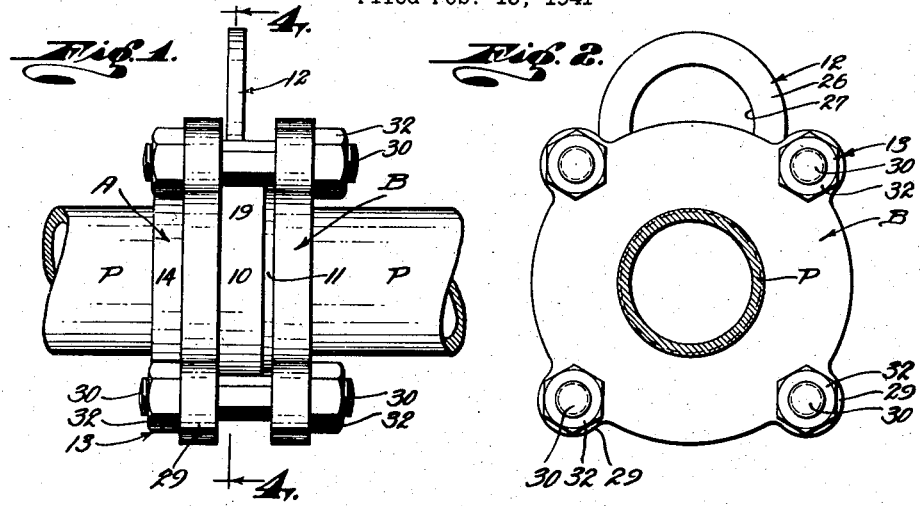
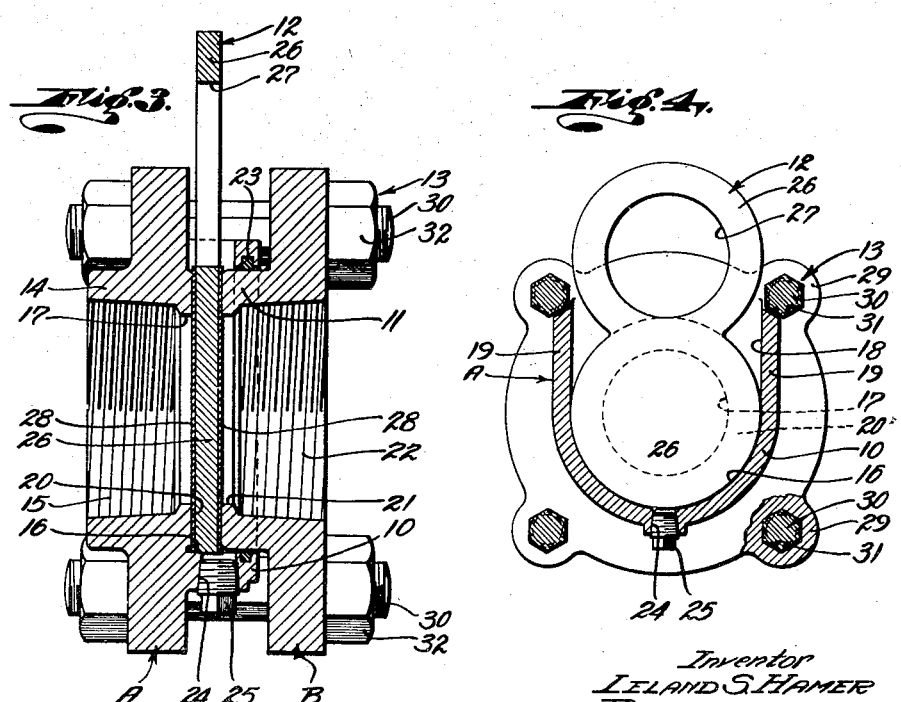
Inventor
LELAND S. HAMER
By
His Attorney Patented Jan. 27, 1942

2,271,138

UNITED STATES PATENT OFFICE 2,271,138

LINE BLIND

Leland S. Hamer, Long Beach, Calif., assignor of one-fourth to Paul A. Dewhirst, Los Angeles, Calif.

Application February 15, 1941, Serial No. 379,050

4 Claims. (Cl. 251—167)

This invention relates to pipe line equipment and relates more particularly to line blinds useful in blinding off or closing pipe lines, etc. A general object of this invention is to provide a simple, quickly operated and inexpensive line blind.

Line blinds are employed in numerous situations in pipe lines and fluid handling systems where it is required to blank off or close a fluid conductor. It has been the general practice in such cases to equip the opposing ends of the pipe sections with standard flanges which are bolted up by an annular series of eight or more bolts to connect the pipes. When it is desired to make a shut off, the operator is obliged to loosen all the nuts and remove at least half of the series of bolts and then insert a blind plate between the flanges and then bolt up the flanges. The loosening and removal of the numerous bolts and the insertion of the plate requires considerable time and during these operations the fluid in the line drains out and is lost. Where inflammable fluids, such as petroleum products, are being handled in the line, the escaping fluid creates a dangerous fire hazard.

Another object of this invention is to provide a line blind device or fitting that makes for the easy and rapid installation, reversal and removal of the plate. The device of this invention has a minimum number of easily accessible bolts which need not be removed, but only loosened when the plate is to be installed, reversed or removed.

Another and important object of the invention is to provide a line blind in which the fluid cannot drain or leak from the pipe line when the plate is being installed, reversed or removed thereby preventing waste of the fluid and eliminating the fire hazard accompanying the employment of conventional line blind equipment.

Another object of this invention is to provide a line blind that is small and compact and which occupies a minimum of space in the line.

Another object of the invention is to provide a line blind that is simple and inexpensive to manufacture and that is easy to install.

A further object of this invention is to provide a line blind that does not embody or require complicated mechanisms or moving parts.

The various objects and features of my invention will be fully understood from the following detailed description of a typical preferred form and application of the invention, throughout which description reference is made to the accompanying drawing, in which:

Fig. 1 is a side elevation of the line blind of the invention showing it connected in a pipe line with the plate in position. Fig. 2 is an end view of the line blind showing one of the pipe sections in transverse cross section. Fig. 3 is an enlarged longitudinal detailed sectional view of the line blind and Fig. 4 is a transverse detailed sectional view taken substantially as indicated by line 4—4 on Fig. 1.

The line blind of the present invention may be said to comprise, generally, two sections A and B having telescopically related hubs 10 and 11, a plate 12 arranged between the sections A and B and means 13 for securing the sections A and B together to releasably clamp the plate 12 between the same.

The sections A and B are adapted to be applied to the opposing ends of pipes P or other adjacent opposing parts of a fluid handling conductor or system. The sections A and B may be constructed for attachment to the pipe line parts in any selected manner, for example, they may be designed to be welded, bolted or screw threaded to the pipe parts. In the case illustrated, the sections A and B are formed to be screw threaded to the pipes P. The sections A and B are similar members resembling flanges.

The section A is provided at its outer side with a boss or hub 14 for connection with its respective pipe part P or the like. In the construction illustrated the hub 14 has an internal thread 15 for cooperating with a thread of the pipe P. The inner side of the section A is provided with the hub 10. The hub 10 is rather large in diameter and has a cylindrical longitudinal opening 16 which is larger in diameter than the opening 17 of the section A. A lateral passage or slot 18 is provided in the wall of the hub 10 to communicate with the opening 16. In the drawing the slot 18 faces upwardly, it being understood that the slot may be otherwise located if desired. As best illustrated in Fig. 4 of the drawing, the length of the slot 18 corresponds to the diameter of the opening 16 and the ends of the slot extend tangentially outward from the walls of the opening 16 and are substantially vertical and parallel. The hub 10 is shaped to have parts or walls 19 extend outwardly to the mouth of the slot 18. The inner wall of the section A is provided with a raised annular seat 20 at the juncture of the openings 16 and 17. The seat 20 faces inwardly or toward the section B.

The section B may have a plain flat outer side and is provided at its inner side with the axial boss or hub 11. The central opening 21 of the section B may have an internal thread 22 to mate with the thread of the pipe P or other pipe line part. It will be noted that the hub 11 increases the length of the opening 21 so that the thread 22 may be of ample length. In accordance with the invention the hub 11 of the section B enters the hub 10 of the section A. The hub 11 preferably extends into the hub opening 16 with clearance. The inner end of the hub 11 is flat and vertical and forms an annular seat which opposes the seat 20.

Means is provided to seal between the hubs 10 and 11 to prevent the fluid from draining from the pipe line when the plate 12 is being installed, reversed or replaced. A sealing ring 23 is partially embedded or recessed in the interior of the hub 10 to engage around the hub 11. The sealing ring 23 is preferably formed of a material which swells or expands through contact with the fluid handled by the pipe line to assure a better and permanent seal. For example, where petroleum products are handled the ring 23 may be formed of a synthetic rubber which is expanded through contact with petroleum products.

It is usually preferred to provide means whereby the line may be drained when the plate 12 is being installed, reversed or replaced. A drain port 24 is provided in the wall of the hub 10 to communicate with the inner or lower portion of the opening 16. The drain port 24 is normally closed by a threaded plug 25. In normal use the drain port 24 may remain closed, however, if it is desired to drain the line the plug 25 may be readily removed to permit the line fluid to drain out the port.

The plate 12 is provided to close off the pipe line and is arranged to be clamped between the opposed telescopic sections A and B. As best illustrated in Fig. 4 of the drawing, the plate 12 comprises two generally disc shaped portions 26 having flat parallel sides and joined by a reduced connecting part or web. One plate portion 26 is imperforate so that it may close off the fitting and the other plate portion 26 usually has an opening 27 corresponding in diameter to the openings 17 and 21. When the device is employed as an orifice meter fitting, the opening 27 is smaller than the passage through the sections A and B and plates 12 having openings of different sizes may be employed as conditions may require. The plate is proportioned so that it may be readily passed into and out of the slot 18. The plate 12 may be passed into the slot 18 to have the edge or periphery of one of its portions 26 engage on the bottom wall of the opening 16. This engagement centers the plate portion 26 between the opposing seat 20 and end of the hub 11.

It is usually preferred to provide means for sealing or packing between the opposite sides of the plate 12 and the sections A and B. In the simple case illustrated, this means comprises flat gaskets 28 arranged on opposite sides of the plate to seal with the seat 20 and the inner end of the hub 11. It is to be understood that the seat 20 and the end of the hub 11 may be equipped with suitable sealing means for cooperating with the plate 12 and that the plate 12 may be equipped with sealing means different from that shown. When the plate 12 is positioned with one of its portions 26 seated in the opening 16 the other plate portion 26 extends outwardly from the slot 18.

The means 13 is operable to connect the sections A and B to urge the sections toward one another so that the plate 12 is retained and sealed in the slot 18. In the preferred construction the means 13 comprises a limited number of spaced lugs 29 on the periphery of each flange-like section A and B. In the particular case illustrated there are four equally spaced lugs 29 on each section A and B. Studs or bolts 30 are passed through aligned axial openings 31 in the lugs 29 and have nuts 32 threaded on their projecting end parts. The nuts 32 are adapted to clamp against the lugs 29 to urge the sections A and B toward one another. In accordance with the invention the bodies or intermediate portions of the studs 20 are polygonal in cross section and the openings 31 are of corresponding shape. The engagement of the studs 30 in the openings 31 holds the studs against rotation, facilitating the tightening and loosening of the nuts 32. The studs 30 are spaced from the mouth of the seat 18 and do not interfere with the insertion or removal of the plate 12.

In the normal use or operation of the fluid system or pipe line, the plate 12 may be in the position where the opening 27 registers with the openings 17 and 21 so that there is a free flow of fluid through the line. The nuts 32 are normally tightened down so that the seat 20 and the inner end of the hub 11 are tightly clamped and sealed against the plate 12. When it is desired to provide a positive shut off for the pipe line the nuts 32 are loosened or backed off and the sections A and B are freed or spread a limited amount. This frees the plate 12 for easy removal. The plate 12 is withdrawn from the slot 18 and is reentered in the slot to have its imperforate portion 26 seat in the opening 16. It is to be noted that it is unnecessary for the operator to remove any of the studs 30 in performing these operations.

It is to be particularly noted that the fluid in the line cannot drain out of the fitting when the plate 12 is freed and removed. The sealing ring 23 effectively seals between the telescoping hubs 10 and 11 preventing the fluid from draining from the line. When the plate 12 has been arranged with its imperforate portion in the opening 16 the nuts 32 are again tightened down so that the seat 20 and the inner end of the hub 11 are clamped and sealed against the plate 12 or its gaskets 28. The limited number of simple nuts 32 are readily accessible and may be quickly backed off and retightened when the plate 12 is reversed or replaced. The polygonal studs 30 cannot turn when the nuts 32 are being loosened and tightened. A minimum of time is required to reverse the plate 12. The device is very simple in construction and is easy to install and operate.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A fitting to be interposed between fluid conductors comprising two tubular sections having means at their outer sides for connection with the conductors, a tubular hub on the inner side of one section, an internal seat in said section, said hub having a lateral slot which joins the interior of the hub at the seat, a hub on the other section telescoping into the first named hub, a plate inserted in the slot to extend across the interior of the first named section, radial flanges on the sections at opposite sides of the slot having polygonal openings, studs having polygonal intermediate portions engaged in said openings and having threaded end portions projecting from the outer sides of the flanges, and nuts threaded on said end portions for engaging the flanges to connect the sections and to urge the sections together so that the plate is clamped between the seat and the inner end of the second named hub, all of said studs being clear of the mouth of the slot.

2. A fitting of the character described comprising two sections adapted to be attached to fluid conducting parts and related for relative axial movement, telescopically related hubs on the sections, the outermost of said hubs having a lateral slot, a plate passed into said slot, flanges on the sections at opposite sides of the slot having polygonal openings, polygonal studs extending through said openings to project beyond the outer sides of the flanges, and nuts on the projecting end parts of the studs for urging the sections toward one another.

3. A fitting of the character described comprising two sections adapted to be attached to fluid conducting parts and related for relative axial movement, telescopically related hubs on the sections, the outermost of said hubs having a lateral slot, a plate passed into said slot, flanges on the sections at opposite sides of the slot having aligned openings, the openings of at least one flange being polygonal, studs extending through the openings and having polygonal portions engaged in the polygonal openings to be held against turning thereby, all of the studs being clear of the mouth of the slot where they do not interfere with the introduction of the plate into the slot and nuts threaded on the studs for cooperating with the flanges to urge the sections toward one another.

4. A fitting of the character described comprising two sections adapted to be attached to fluid conducting parts and related for relative axial movement, telescopically related hubs on the sections, the outermost of said hubs having a lateral slot, a plate passed into said slot, flanges on the sections at opposite sides of the slot having aligned openings, and connecting members extending through said openings for connecting the sections, all of said members being clear of the mouth of the slot so that they do not interfere with the insertion or removal of the plate.

LELAND S. HAMER.